March 16, 1971  E. A. ALEXANDER  3,570,241
FLAME TUBE FOR COMBUSTION CHAMBER OF A GAS TURBINE ENGINE
Filed July 29, 1969
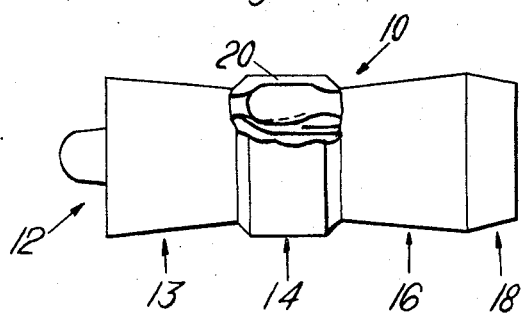
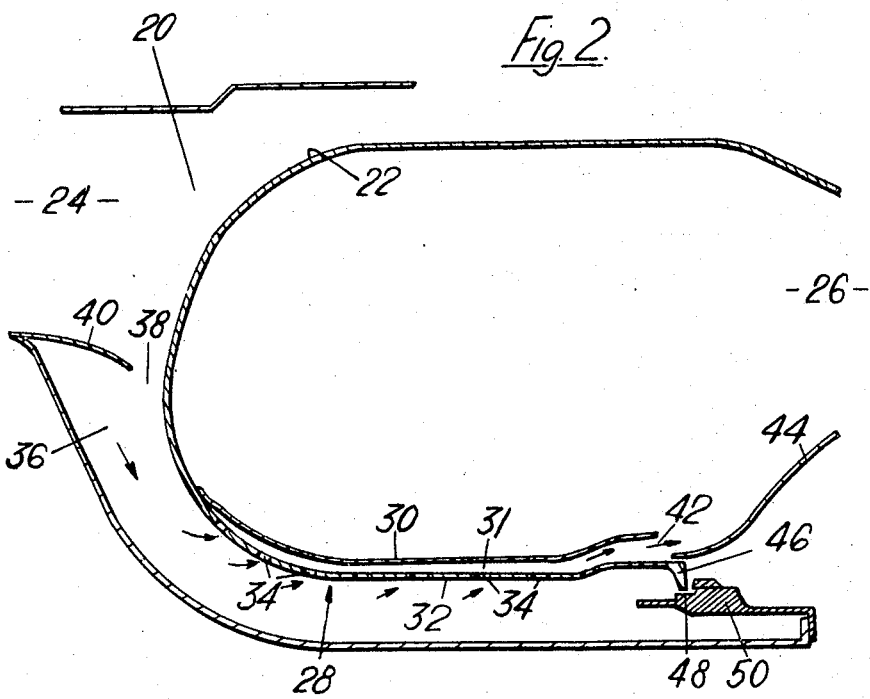
Inventor
ERIC ARCHIE ALEXANDER
By
Cushman, Darby & Cushman
Attorneys 3,570,241
FLAME TUBE FOR COMBUSTION CHAMBER OF
A GAS TURBINE ENGINE
Eric Archie Alexander, Aston-on-Trent, Derby, England,
assignor to Rolls-Royce Limited, Derby, England
Filed July 29, 1969, Ser. No. 845,792
Claims priority, application Great Britain, Aug. 2, 1968,
37,091/68
Int. Cl. F02c 7/18
U.S. Cl. 60—39.65                                    5 Claims

ABSTRACT OF THE DISCLOSURE

A flame tube for a gas turbine engine combustion chamber, a wall of the flame tube being double-skinned for at least the greater part of its axial length over at least a portion of its circumference, the double-skinned portion of the wall comprising an internal skin spaced from an external skin to define an axially elongated passage, the passage receiving cooling air and being open at its downstream end to the interior of the flame tube to direct cooling air emerging from the passage across an internal surface of the flame tube wall to effect film cooling thereof, the external skin having apertures adapted to direct jets of cooling air forcefully onto the internal skin, so that no boundary layer is formed in the cooling air flowing through said passage.

---

This invention relates to flame tubes for gas turbine engines.

According to the invention there is provided a flame tube for a gas turbine engine, the flame tube having a wall which is double-skinned for at least the greater part of its axial length over at least a portion of its circumference, the double-skinned portion of the wall comprising an internal skin spaced from an external skin to define an axially elongated passage therebetween. Means defining apertures are provided to admit cooling air to the passage, the passage being open at its downstream end to the interior of the flame tube for discharging the air. Means are provided to direct cooling air emerging from the passage across an internal surface of the flame tube wall, thus effecting film cooling thereof. The apertures are in the external skin and direct jets of cooling air forcefully onto the internal skin to prevent formation of a boundary layer in the air flowing through the passage and, thus, promoting cooling of the internal skin.

The said apertures may be adapted to direct the jets of cooling air onto the internal skin at a substantial angle to the surface thereof.

The flame tube may be adapted to be disposed within a combustion chamber of a gas turbine engine with its longitudinal extent extending longitudinally of the engine, a radially inner portion of the flame tube wall with respect to the said axis being double-skinned.

The flame tube may be annular.

The invention also provides a gas turbine engine having a flame tube as set forth above.

A duct may extend around the flame tube and radially inwardly thereof and communicate with the said apertures, the upstream end of the duct communicating with the upstream end of a combustion chamber of the engine.

The flame tube may be located relative to the combustion chamber of the enine by a locating member which also seals the downstream end of the said duct.

The invention will be described, merely by way of example, with reference to the accompanying drawings, wherein FIG. 1 shows a gas turbine engine having a flame tube according to the invention, and FIG. 2 shows part of the structure of FIG. 1.

A gas turbine engine 10 comprises an air inlet 12, a compressor 13, a combustion section 14, a turbine 16 and a jet nozzle 18.

The combustion section 14 comprises an annular combustion chamber 20, wherein there is contained an annular flame tube 22 (FIG. 2). The longitudinal extent of the flame tube is substantially parallel to the longitudinal axis of the engine, and its axis is substantially coaxial therewith. Compressed air from the compressor 13 enters the combustion chamber via an air inlet passage 24, at the upstream end thereof, and the greater part of it enters the flame tube via conventional primary, secondary and tertiary air inlet holes (not shown). Fuel is injected into the flame tube 22 via several injector nozzles (not shown), and the products of combustion leave the flame tube at the downstream end 26 thereof and thereafter pass to the turbine 16.

During combustion of the fuel, some parts of the flame tube unavoidably become hotter than other parts, and the life of the flame tube may be governed by the life of the hottest parts, even though other parts of the flame tube may have a much longer life. In some annular flame tubes, the hottest region has been found to be the radially inner wall 28 of the flame tube. The radially inner wall 28 of the flame tube is therefore of double-skinned construction, the double skin extending for at least the greater part of the length of the flame tube. The double-skinned portion 28 comprises an internal skin 30 spaced from an external skin 32 to define a passage 31 therebetween, and the external skin 32 has a number of apertures 34 therein which are adapted to direct jets of cooling air onto the internal skin 30, the cooling air thereafter flowing through the passage 31.

The apertures 34 direct the jets of cooling air forcefully onto the surface of the internal skin 30 at a substantial angle thereto, thereby preventing formation of a boundary layer and promoting turbulent flow of the air in the passage 31, to improve the cooling of the internal skin 30.

The cooling air passage 31 is open at its downstream end 42 to the interior of the flame tube 22, and directs cooling air emerging from the passage 31 across the internal surface of a downstream portion 44 of the flame tube wall to effect film cooling thereof.

The cooling air is obtained from the combustion chamber air inlet passage 24 via a duct 36 which extends around the flame tube and radially inwardly thereof and communicates with the apertures 34. The rate of flow of cooling air is determined by the size of a restriction 38 in the duct 36 which is defined between the upstream end of the flame tube 22 and an annular flange member 40 extending from the upstream end of the combustion chamber.

The downstream portion 44 of the flame tube is a telescoped sliding fit within the downstream end of the external skin 32, the sliding fit permitting relative longitudinal expansion of the two parts. The downstream end of the exteral skin 32 also carries a radially inwardly extending flange 46 which is slidingly received upon a circumferential shoulder 48 defined in a part 50 of the combustion chamber. The flange 46 locate the flame tube 22 relative to the combustion chamber, and also, with the shoulder 48, forms a seal for the downstream end of the duct 36, to reduce the escape of cooling air therethrough.

It will be appreciated that the use of the invention is not restricted to extending the life of the hottest parts of a flame tube, but also may be utilised to render a portion of a flame tube cooler than the remainder thereof. For example, if a portion of the flame tube is adjacent a shaft bearing, then it is desirable to cool that portion of the flame tube to avoid subjecting the shaft bearing to high temperatures. Of course, if desired, the flame tube may be made entirely double skinned.

It will also be appreciated that the invention is applicable to the can-type of flame tube, and that the double-skinned portion need not be the portion which is radially inward with respect to the engine axis.

I claim:

1. A flame tube for a gas turbine engine, said flame tube having a wall with a portion which is double-skinned for at least a greater part of said flame tube's axial length over at least a portion of said flame tube's circumference, said double-skinned portion of said wall comprising an internal skin spaced from an external skin to define an axially elongated passage therebetween, means defining apertures to admit cooling air to said passage, said passage being open at its downstream end to the interior of said flame tube, said open downstream end being arranged to direct cooling air emerging from said passage across an internal surface of said flame tube wall for effecting film cooling thereof, said apertures being arranged in said external skin substantially along the length of said axially elongated passage so as to direct jets of cooling air forcefully onto said internal skin thereby preventing formation of a boundary layer in air flowing through said passage and promoting cooling of said internal skin.

2. A flame tube as claimed in claim 1 wherein the flame the flame tube is annular in cross-section with respect to its axial length.

3. A gas turbine engine having in flow series compressor means, a combustion chamber and turbine means, said combustion chamber comprising a flame tube having a wall with a portion which is double-skinned for at least a greater part of said flame tube's axial length over at least a portion of said flame tube's circumference, said double-skinned portion of said wall comprising an internal skin spaced from an external skin to define an axially elongated passage therebetween, means defining apertures to admit cooling air to said passage, said passage being open at its downstream end to the interior of said flame tube, said open downstream end being arranged to direct cooling air emerging from said passage across an internal surface of said flame tube wall for effecting film cooling tereof, said apertures being arranged in said external skin substantially along the length of said axially elongated passage so as to direct jets of cooling air forcefully onto said internal skin thereby preventing formation of a boundary layer in air flowing through said passage and promoting cooling of said internal skin.

4. A gas turbine engine as claimed in claim 3 wherein said flame tube is annular and has its axial length extending substantially parallel to the longitudinal axis of the engine, said double-skinned portion defining a radially inner portion of said flame tube wall, a duct extending around at least a portion of said flame tube and positioned radially inwardly therefrom, said duct communicating with said apertures in said external skin portion and having an upstream end communicating with an upstream end of said combustion chamber.

5. A gas turbine engine as claimed in claim 4 comprising locating means to locate the flame tube relative to the combustion chamber of the engine, said locating means comprising means to seal the downstream end of the said duct.

References Cited

UNITED STATES PATENTS

| 3,038,309 | 6/1962 | Waters | 60—39.66 |
| 2,973,624 | 3/1961 | Pierce et al. | 60—39.66X |
| 2,711,074 | 6/1965 | Howard | 60—39.66X |

FOREIGN PATENTS

| 809,514 | 2/1959 | Great Britain | 60—39.65 |
| 877,251 | 9/1961 | Great Britain | 60—39.65 |

DOUGLAS HART, Primary Examiner

U.S. Cl. X.R.

60—39.66; 431—352